Figure 1:
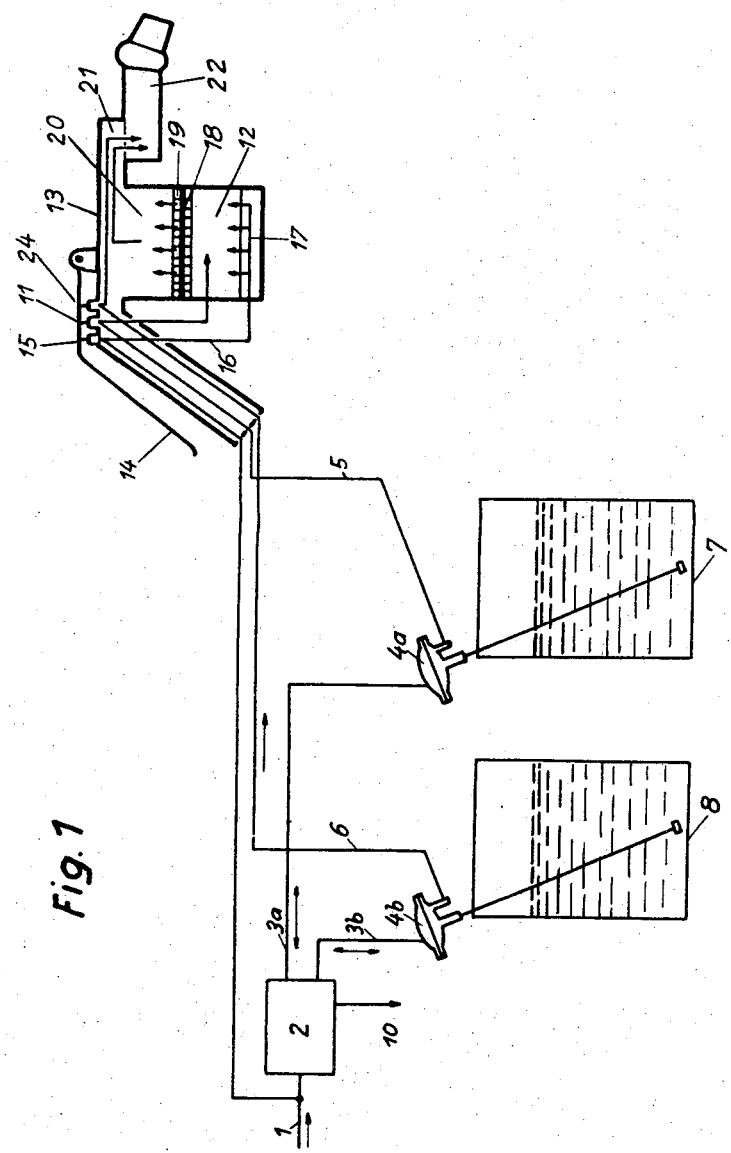

July 10, 1962     O. A. VIELI     3,043,670
DEVICE FOR MANUFACTURING FOAM
Filed July 14, 1959     3 Sheets-Sheet 1

INVENTOR.
O. A. Vieli
BY Richards Geier
ATTORNEY

July 10, 1962 O. A. VIELI 3,043,670
DEVICE FOR MANUFACTURING FOAM
Filed July 14, 1959 3 Sheets-Sheet 3
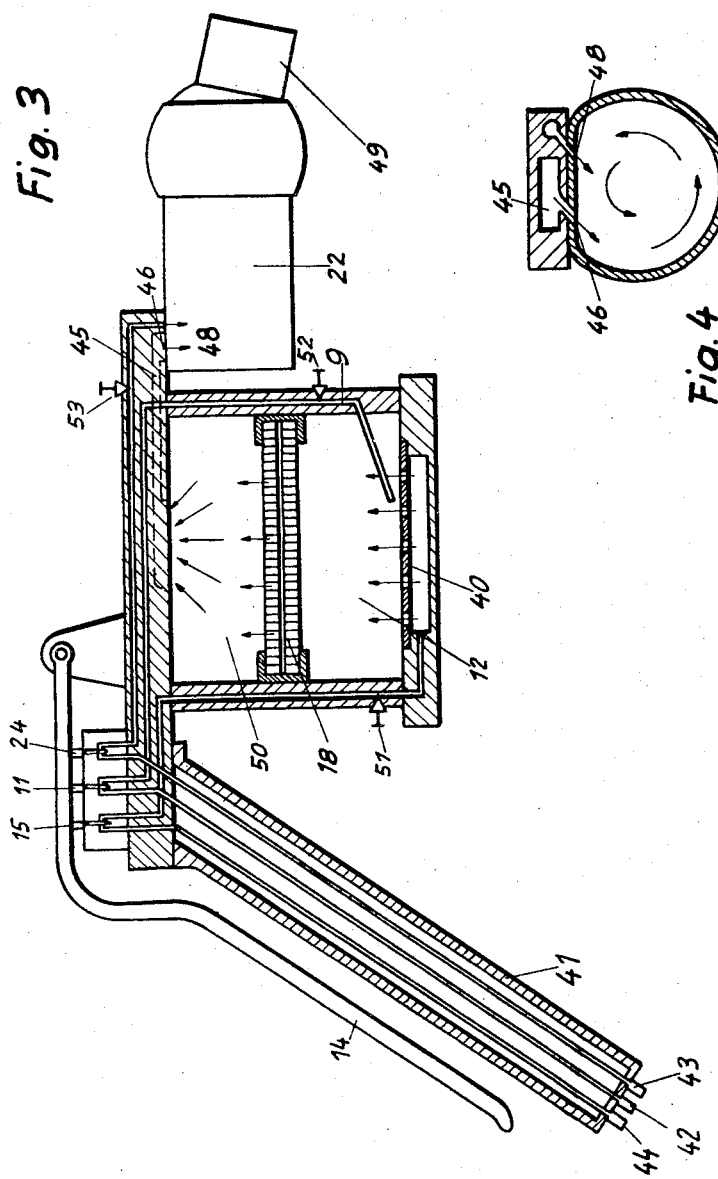
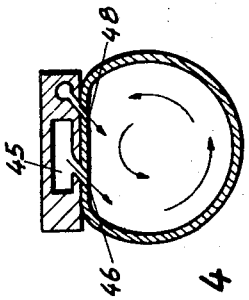
INVENTOR.
O. A. Vieli
BY Richards & Geier
ATTORNEYS

United States Patent Office 3,043,670
Patented July 10, 1962

3,043,670
DEVICE FOR MANUFACTURING FOAM
Otto Anton Vieli, Rhazuns, Graubunden, Switzerland, assignor, by mesne assignments, to Werner H. Kreidl, New York, N.Y.
Filed July 14, 1959, Ser. No. 826,955
Claims priority, application Switzerland July 18, 1958
5 Claims. (Cl. 23—285)

The present invention relates to a device for the production of synthetic foam formed of two components. More specifically, the invention relates to a device for the production of foam which consists of a pneumatic foam generator in which a mixture of one component and a foaming agent is pneumatically foamed. In addition a mixer is arranged downstream of the foam generator in which the foam obtained is foamed with the second of said two components. There is also provided a supply container for each component and conveyor units which supply the two components to the foam generator and the mixer.

Devices of this type are known but reveal a number of substantial disadvantages. In the production of plastic foam it is known to be of prime importance that the plastic agent solution, its catalyst, the foaming agent solution and the foam producing compressed air must be dosed in a predetermined proportion within very narrow limits if a foam meeting all requirements is to be produced.

In the devices so far known each of the two components and the compressed air required a separate valve which enabled the volume of each component supplied to be regulated. However, experience has shown that the volume passed alters during the foam producing process so that subsequent adjustment is required. The change in the supply volume adjusted may be attributable to a change in the contents of a supply container. A further disadvantage of the conventional devices for the production of foam consists in that an unserviceable foam is produced at the beginning of the production process until the individual valves are properly adjusted, which is a considerable disadvantage in respect of time consumption and also in respect of proper utilization of the material. Moreover, since the foam produced changes its properties only with a certain time lag after the change of the valve adjustment, accurate adjustment of the valves is extremely difficult and can be performed only by well-trained experts. Adjustment of the foam volume to be produced by the unit is also very difficult with the known foam producing devices since the three valves must at least be readjusted for a change of the foam volume.

It is the object of the present invention to provide a foam producing device which is free from the above-mentioned disadvantages and which can be manipulated in a manner which is extremely simple.

According to one aspect of the invention, this object is achieved by coupling the supplied volume of the two components, of which one may already be mixed with the foaming agent solution, with the supply of pressurized gas in such a manner that the ratio among the initial materials supplied to the foam producing units is always constant. The present invention further provides a valve arrangement which enables the two resin components and the compressed air to be only jointly supplied to the foam generator.

One device according to this invention may be characterized by the fact that the conveyor means for the components are supplied by a pressurized gas and so designed that the volume supplied per unit time depends on the pneumatic pressure supplied, the pressurized gas required for the pneumatic foaming being taken from the same pressure source so that the ratio between the volumes of the pressurized gas supplied to the foam generator and of the first resin component, and of the second resin component supplied to the mixer are independent of the pneumatic pressure. Furthermore a valve is provided for each of the two resin components and the pressurized gas, the said valves being operable by a common handle.

Examples for the two components which may be used to produce synthetic foam are disclosed in my co-pending application Serial No. 755,876, filed August 19, 1958.

Figure 2:
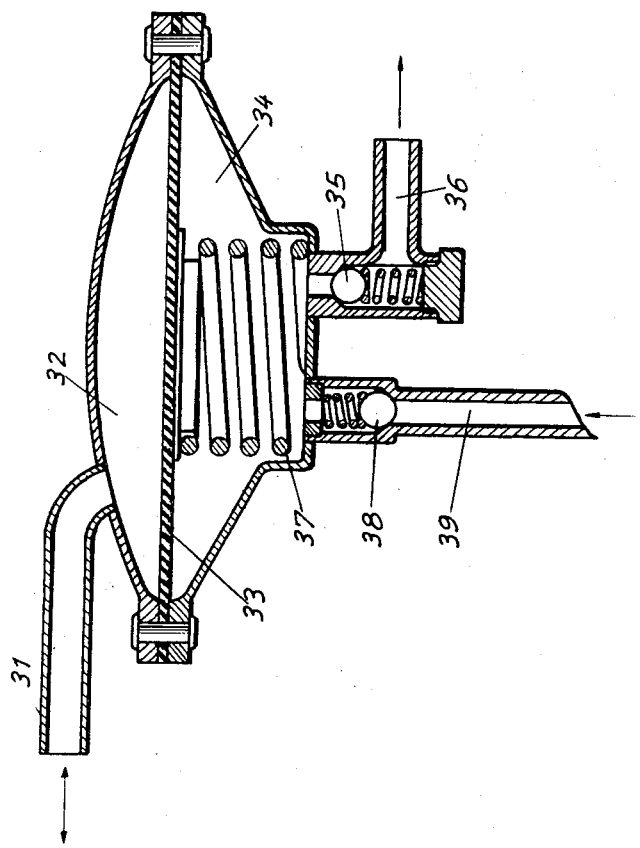

Other objects and features of the present invention will become apparent from the following description taken in connection with the attached drawings wherein:
FIG. 1 is a diagrammatic view of the entire device;
FIG. 2 is a section of the pneumatically operated diaphragm pump;
FIG. 3 is a section of the manual foaming unit, and
FIG. 4 is a cross-sectional view of the swirl tube.

According to FIG. 1 the complete device consists of a compressed air control unit 2 of conventional design connected to a compressed air supply 1. The control unit 2 may also be controlled electrically. The pneumatic control unit 2 passes compressed air, via the lines 3a and 3b, to the pneumatic diaphragm pumps 4a and 4b; the unit 2 controls simultaneously the pressure and suction cycles of the individual pumps 4a and 4b in a conventional way. Expansion of exhaust air occurs at 10.

A foaming resin solution is supplied to the manual foam generating unit 13 from the supply container 7 via the hose duct 5 by means of the pump 4a. Through the instant-action valve 11, the foaming solution is forced into the impregnating chamber 12. Depressing the handle 14 opens the instant-action valve 15 so that compressed air enters the impregnating chamber 12 through duct 16 and the air distributor 17. Further depression of the handle 14 opens the instant-action valve 11 for the resin solution. The coarse foam formed in the impregnating chamber 12 is forced through the (sintered) strainer plate 18 by the overpressure so that a very finely porous foam is produced on the downstream side of the (sintered) strainer plate 18. The foam is passed into the swirl chamber 22 of the foam generating unit 13 through duct 21. From the diaphragm pump 4b the hardening agent is passed into the swirl chamber 22 through a duct 6 via the third stage 24 of the instant-action valve. By means of tangential inlet openings, a very strong turbulence and swirling action is obtained in the swirl chamber 22 so that the foam and the hardening agent are intimately mixed.

FIG. 2 is a section of the pneumatically operated diaphragm pump in which compressed air enters the chamber 32 at 31 via a control valve so that the diaphragm is depressed. This causes the material (resin, hardening agent) held in chamber 34 to be forced into the pressure lines 5 and 6 respectively via a check valve 35. When the control valve allows the compressed air to drain from the chamber 32, the spring 37 will return the diaphragm 33 to its raised position. This results in a negative pressure in the chamber 34 so that substance is again sucked from the suction tube 39 via the check valve 38.

This sequence is repeated in a synchronized rhythm of the compressed air control unit. As soon as the consumption of solution is smaller than the supply, pressure is equalized and the diaphragm remains in position. The pressure of the two components resin and hardening agent thereby automatically adjusts itself. This enables the volume of foam desired to be produced to be largely adjusted by means of the amount of primary pressure of the compressed air.

FIG. 3 shows a cross-section of the manual foam generating unit. Arranged at the end of the handle 41 are the line connections for resin 42, hardening agent 43 and compressed air 44.

Via the instant-action valves 15, 11 and 24, which can be gradually opened by means of handle 14, compressed air will first pass, via the valve 15, through a perforated plate 40 into the impregnating chamber 12. Depressing the handle 14 further will cause the instant action valve 11 for the resin to be opened. This resin passes on to the finely perforated plate 40 through duct 9 and into the impregnating chamber 12.

The coarse foam obtained in the impregnating chamber 12 passes through the strainer plate 18 formed of sintered material into the expansion chamber 50 and hence, via a duct 45 and through a tangential inlet 46 (FIG. 4), into a swirl tube 22. The foam is given a rapid rotational movement and swirled. Further depression of the handle 14 finally opens the last valve 24 for the hardening agent and the latter flows into the swirl tube 22 through a tangential opening 48 (FIG. 4), and is intimately mixed with the foam. The adjustable nozzle 49 expels the foam.

The supply ducts are throttled by regulating valves 51, 52, 53 in such a manner that the mixing ratio always remains constant. In industrial production, the regulating valve 53 must, however, be capable of being adjusted by hand in order to enable the quality of the resin to be corrected by changing the dosage. The total volume of foam is regulated by increasing or reducing the primary air pressure. According to this invention, instead of the resin foam mixture, the hardening agent may also be mixed with a foaming agent and the appropriate resin solution be added to this hardener foam. The resin solution may possess a solids content of .1 to 50%. A concentration of 25% is the most advantageous.

The process and device according to this invention enables a very light, uniform and finely porous foam to be produced. The device is largely fool-proof by the stepped operation of the valves; it is self-cleaning and has a low weight. It may be adjusted and used for various types of two-component resins.

Having now particularly described and ascertained the nature of my said invention and in what manner the same is to be performed, I declare that what I claim is:

1. In a device for the production of synthetic foam by mixing in accordance with a selectively variable predetermined ratio two components in the presence of compressed gas, the combination of a two-branch conduit fed from a source of pressurized gas, a control unit connected to one branch of said conduit, two pumps, each being operable when energized to deliver one of said components, both pumps being connected to said control unit receiving from said control unit pump energizing pulsating gas streams apportioned in accordance with the said ratio, and a foam generating unit comprising a structure defining on its interior in succession a gas chamber interconnected to the other branch of said conduit for receiving compressed gas, an impregnating chamber connected to the pump of one component for receiving delivered therefrom said one component and an expansion chamber, said structure furthermore defining a mixing chamber connected to said expansion chamber and interconnected to the other pump for receiving delivered therefrom the other component, a perforated guide separating said gas and impregnating chambers guiding the compressed gas into the impregnating chamber producing therein with the first component coarse foam, a strainer separating said impregnating and expansion chambers, the pressure of the gas forcing the coarse foam from the impregnating chamber through the strainer into the expansion chamber producing thereby a finely porous foam, said gas chamber, impregnating chamber and expansion chamber being aligned in one direction in said structure, the compressed gas proceeding in that direction throughout from said gas chamber through said impregnating chamber to said expansion chamber, the pressure of said gas thence forcing the finely porous foam from the expansion chamber into the mixing chamber, said second component being intimately mixed with the foam in the mixing chamber, and valve means including a single handle for controlling the delivery of the compressed gas and the two components to the respective chambers.

2. In a device, as claimed in claim 1, said pumps being diaphragm pumps including oppositely arranged check valves for the pulsating delivery of said components to the respective chambers.

3. A device as claimed in claim 1, together with individual throttle means disposed in the delivery line upstream of the respective chamber on the foam generating unit each being adjustable to regulate the flow in the delivery line of the pressurized gas and of each component, respectively.

4. In a device, as claimed in claim 1, said valve means including three separate valves comprising a first valve for controlling the delivery of the compressed gas to the gas chamber, the second valve for controlling the delivery of the one component to the impregnating chamber, and the third valve for controlling delivery of the other component to the mixing chamber, said handle being actuatable to operate said three valves simultaneously, said valves and said handle being so arranged that upon application of said handle to said valves they will be operated in sequential succession until all three are energized, so that there will first be delivered to the foam generating unit compressed gas, thereafter the one component and subsequently the other component.

5. In a device, as claimed in claim 4, said handle being turnable about a fulcrum, said valves being arranged along a radial plane of said fulcrum, and said valves being so arranged that said handle makes contact first with said first valve and secondly with said second valve and subsequently with said third valve when the handle is turned about the fulcrum and applied to the valves.

References Cited in the file of this patent
UNITED STATES PATENTS

| 2,673,723 | Keen | Mar. 30, 1954 |
| 2,779,689 | Reis | Jan. 29, 1957 |
| 2,894,732 | Taber et al. | July 14, 1959 |